United States Patent
Genoni et al.

(10) Patent No.: US 11,131,414 B2
(45) Date of Patent: Sep. 28, 2021

(54) ELECTROWELDABLE BRANCH FITTING FOR HIGH DIAMETER PIPES AND RELATIVE WELDING METHOD

(71) Applicant: NUPI INDUSTRIE ITALIANE S.p.A., Busto Arsizio (IT)

(72) Inventors: Marco Genoni, Arese (IT); Arturo Petruccelli, Busto Arsizio (IT)

(73) Assignee: NUPI INDUSTRIE ITALIANE S.p.A., Busto Arsizio (IT)

( * ) Notice: Subject to any disclaimer, the term of this patent is extended or adjusted under 35 U.S.C. 154(b) by 199 days.

(21) Appl. No.: 16/424,259

(22) Filed: May 28, 2019

(65) Prior Publication Data
US 2019/0360625 A1 Nov. 28, 2019

(30) Foreign Application Priority Data
May 28, 2018 (IT) .......................... 102018000005775

(51) Int. Cl.
*F16L 47/03* (2006.01)
*F16L 41/02* (2006.01)
*B29D 23/00* (2006.01)

(52) U.S. Cl.
CPC .......... *F16L 41/021* (2013.01); *B29D 23/005* (2013.01); *F16L 47/03* (2013.01)

(58) Field of Classification Search
CPC .......... F16L 41/04; F16L 41/082; F16L 47/03
USPC ...................................................... 285/21.2
See application file for complete search history.

(56) References Cited

U.S. PATENT DOCUMENTS

| | | | | | |
|---|---|---|---|---|---|
| 3,987,276 | A | * | 10/1976 | Vogelsanger | ........... F16L 47/03 219/535 |
| 5,321,233 | A | * | 6/1994 | Barrett | ..................... F16L 47/03 219/535 |
| 5,601,315 | A | * | 2/1997 | Bunger | ................... F16L 47/03 285/184 |

(Continued)

FOREIGN PATENT DOCUMENTS

| | | |
|---|---|---|
| DE | 29512309 U1 | 1/1996 |
| DE | 69311428 T2 | 10/1997 |

(Continued)

*Primary Examiner* — David Bochna
(74) *Attorney, Agent, or Firm* — Cantor Colburn LLP

(57) ABSTRACT

An electroweldable branch fitting for high diameter pipes comprises at least a first collar (20, 20') provided with a predetermined radius of curvature (R), wherein the collar (20, 20') identifies on opposite sides a concave surface (21) and a convex surface (22), further comprising at least one first electrical wire winding (23) associated with the concave surface (21) of the collar (20, 20') and carrying one first pair of electrical terminals (24), arranged on the convex surface (22) of the collar (20, 20') for applying an electric current adapted to cause the electrofusion of the collar (20, 20'), wherein the concave surface (21) of the collar (20, 20') is continuous, i.e. not perforated, and wherein the first electrical wire winding (23) is uniformly distributed on the concave surface (21) at least in the central part thereof, the collar (20, 20') being provided with a branch sleeve (30), centrally on the convex surface (22), for the connection to a branch pipe, the branch sleeve identifying a blind hole (32) having a bottom wall (32) consisting of the wall of the collar (20, 20').

8 Claims, 5 Drawing Sheets

(56) References Cited

U.S. PATENT DOCUMENTS

| | | | | |
|---|---|---|---|---|
| 6,274,073 B1 * | 8/2001 | Schafstein | ............... | F16L 47/03 |
| | | | | 219/535 |
| 6,364,367 B1 * | 4/2002 | Hintzen | ................. | F16L 47/03 |
| | | | | 285/197 |
| 2007/0252383 A1 * | 11/2007 | Tappe | ................. | B29C 66/1312 |
| | | | | 285/41 |
| 2019/0137024 A1 * | 5/2019 | Cooper | ................. | F16L 47/345 |

FOREIGN PATENT DOCUMENTS

| | | | | |
|---|---|---|---|---|
| EP | 3001087 A1 * | 3/2016 | ............... | F16L 47/03 |
| FR | 2516439 A1 | 5/1983 | | |
| GB | 2137297 A | 10/1984 | | |
| WO | WO-2009122115 A1 * | 10/2009 | ............... | F16L 47/03 |
| WO | 2015177785 A1 | 11/2015 | | |

\* cited by examiner

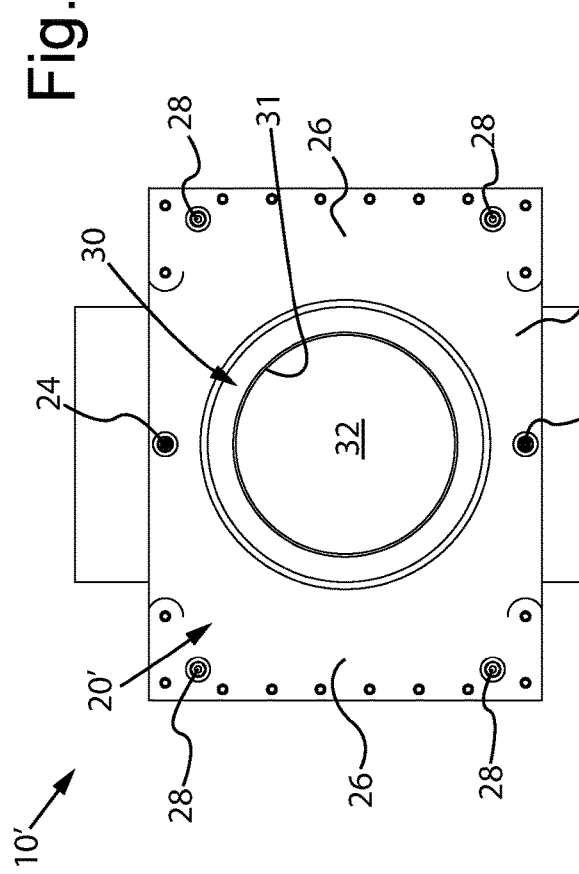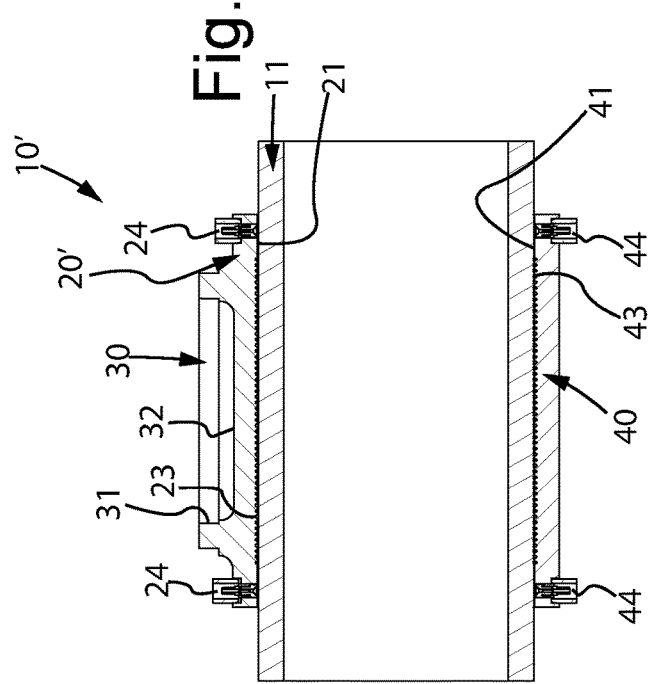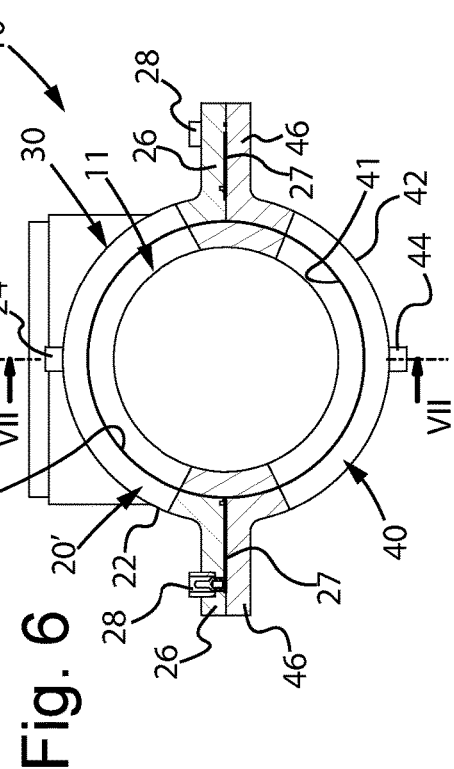

ELECTROWELDABLE BRANCH FITTING FOR HIGH DIAMETER PIPES AND RELATIVE WELDING METHOD

CROSS REFERENCE TO RELATED APPLICATION

This application is related to and claims the benefit of Italian Patent Application Number 102018000005775 filed on May 28, 2018, the contents of which are herein incorporated by reference in their entirety.

TECHNICAL FIELD

The present invention relates to an electroweldable branch fitting for high diameter pipes and a relative welding method.

BACKGROUND

For making branches from pipes it is known to use electroweldable saddle fittings, which are provided with a branch sleeve extending from a curved annular wall adapted to be coupled to the wall of the main pipe. The annular wall is provided with an electrical wire winding arranged annularly around the branch hole on one of the concave or convex surfaces of the curved wall. The application of an electric current to such wire through a pair of electrical terminals causes the welding by electrofusion of the fitting to the pipe in the annular portion around the branch sleeve.

The main drawback of known fittings comes from the impossibility to apply them with sufficient reliability to high diameter pipes. In fact, the so-called "cold zones", i.e. the curved wall portions not affected by electrofusion welding cause weak points that could collapse under the pressure inside the pipes.

A further drawback of electroweldable saddle fittings of the known type is their application only for branches with a reduction in diameter between the main pipe and the branch pipe. In fact, T-branches, i.e. between pipes of the same diameter, are now generally performed by head welding T-shaped fittings. This method necessarily requires an interruption to the continuity of the main pipe and the application of a reduction in the maximum pressure allowed inside the pipes exactly due to the effect of the head welding of the T-shaped fitting.

SUMMARY

The object of the present invention is that of realizing an electroweldable branch fitting for high diameter pipes and a relative welding method that overcomes the drawbacks of known electroweldable branch fittings and in particular that makes it possible to have high diameter branches in proportion to the diameter of the main pipe.

Another object of the present invention is that of realizing an electroweldable branch fitting for high diameter pipes and a relative welding method that allows a T-branch to be realized between pipes of the same diameter.

Another object of the present invention is that of realizing an electroweldable branch fitting for high diameter pipes and a relative welding method that is particularly simple and functional, with contained costs.

These objects according to the present invention are achieved by realizing an electroweldable branch fitting for high diameter pipes and a relative welding method as disclosed in the independent claims.

Further characteristics are envisaged in the dependent claims.

BRIEF DESCRIPTION OF THE DRAWINGS

The features and advantages of an electroweldable branch fitting for high diameter pipes and a relative welding method according to the present invention will be more apparent from the following description, which is to be understood as exemplifying and not limiting, with reference to the schematic attached drawings, wherein:

FIGS. 5 and 6 are a plan view and a side elevational, partially sectioned, view, respectively, of the fitting of FIG. 4;

FIG. 7 is a section of the fitting of FIG. 4 realized according to a plane of trace VII-VII;

DETAILED DESCRIPTION OF THE DRAWINGS

Figure 1:
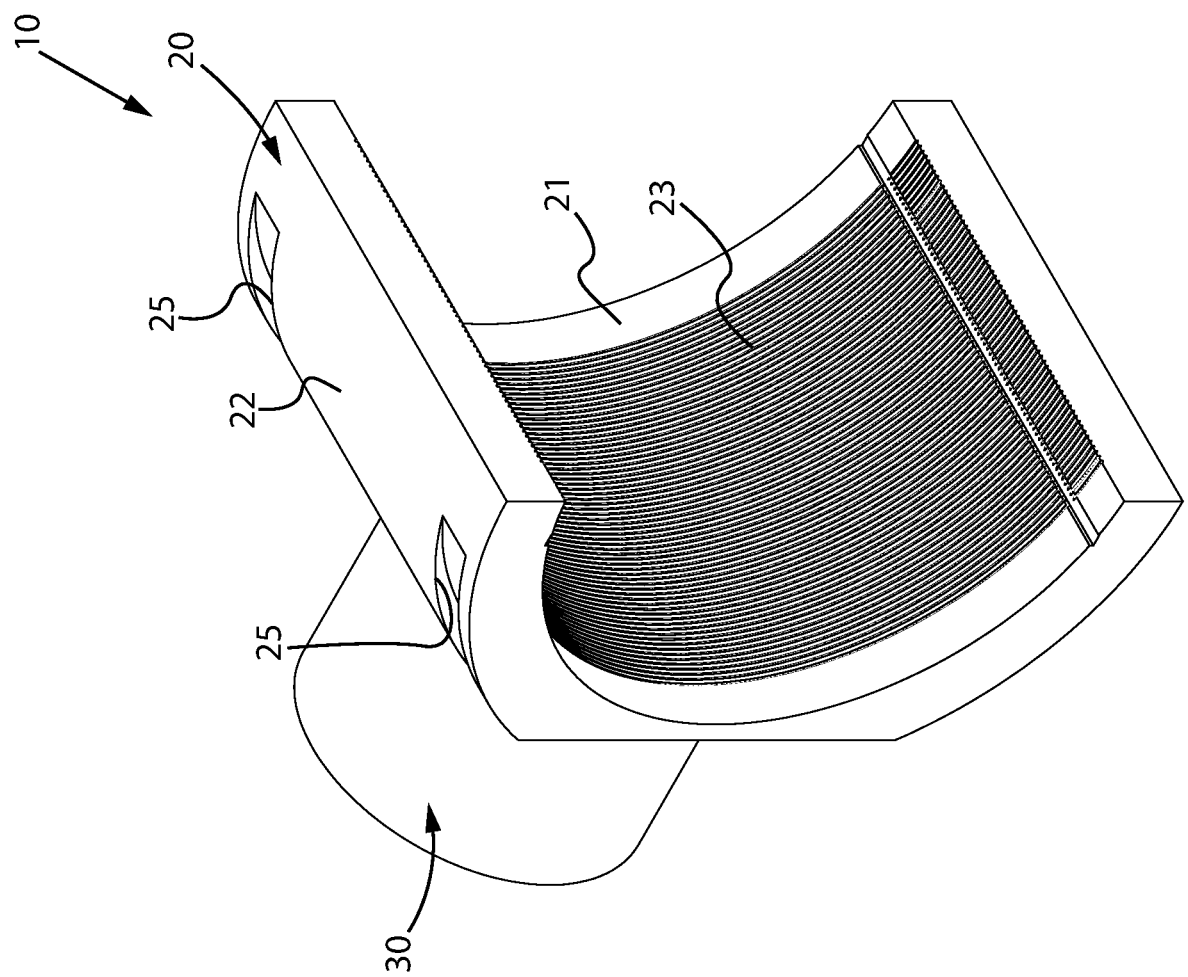
FIG. 1 is a perspective view of an electroweldable branch fitting for high diameter pipes according to a first embodiment of the present invention.
Figure 2:
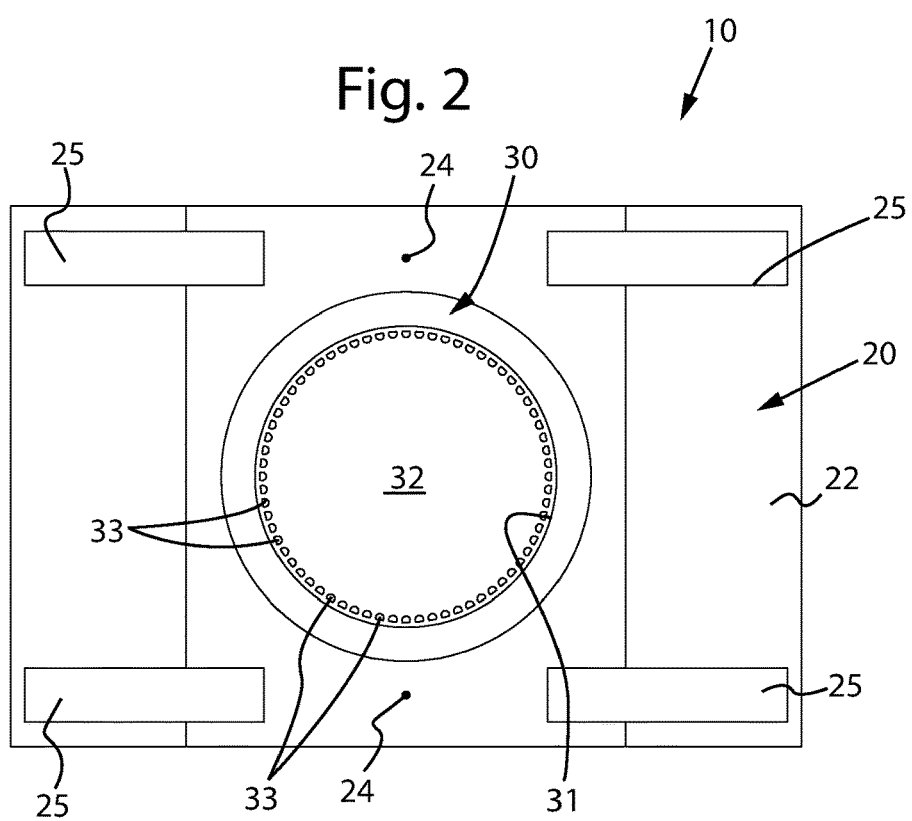
FIGS. 2 and 3 are a plan view and a side elevational, partially sectioned, view, respectively, of the fitting of FIG. 1.
Figure 3:
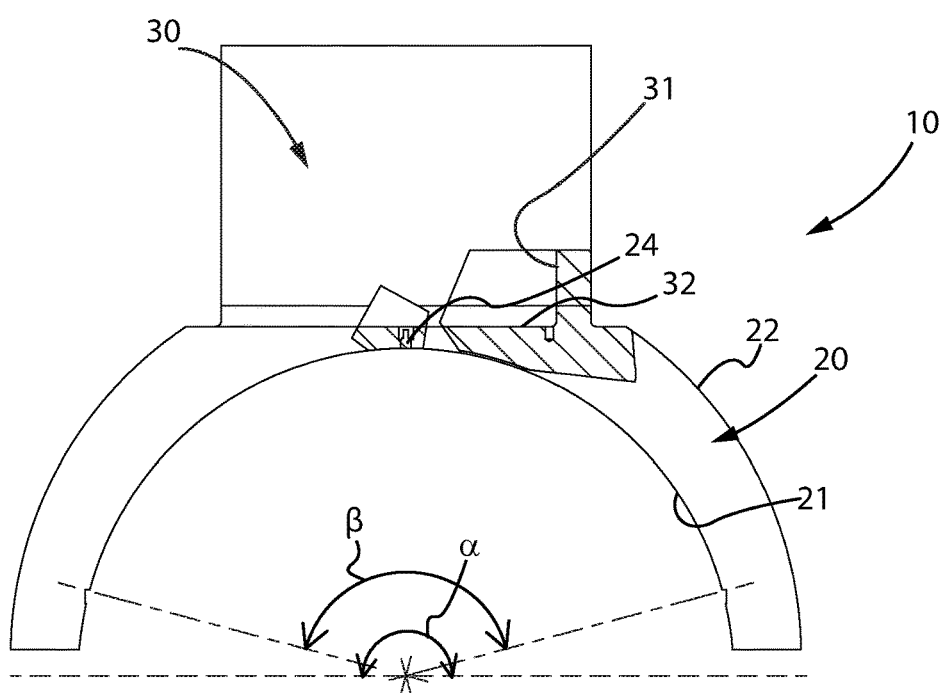
Figure 4:
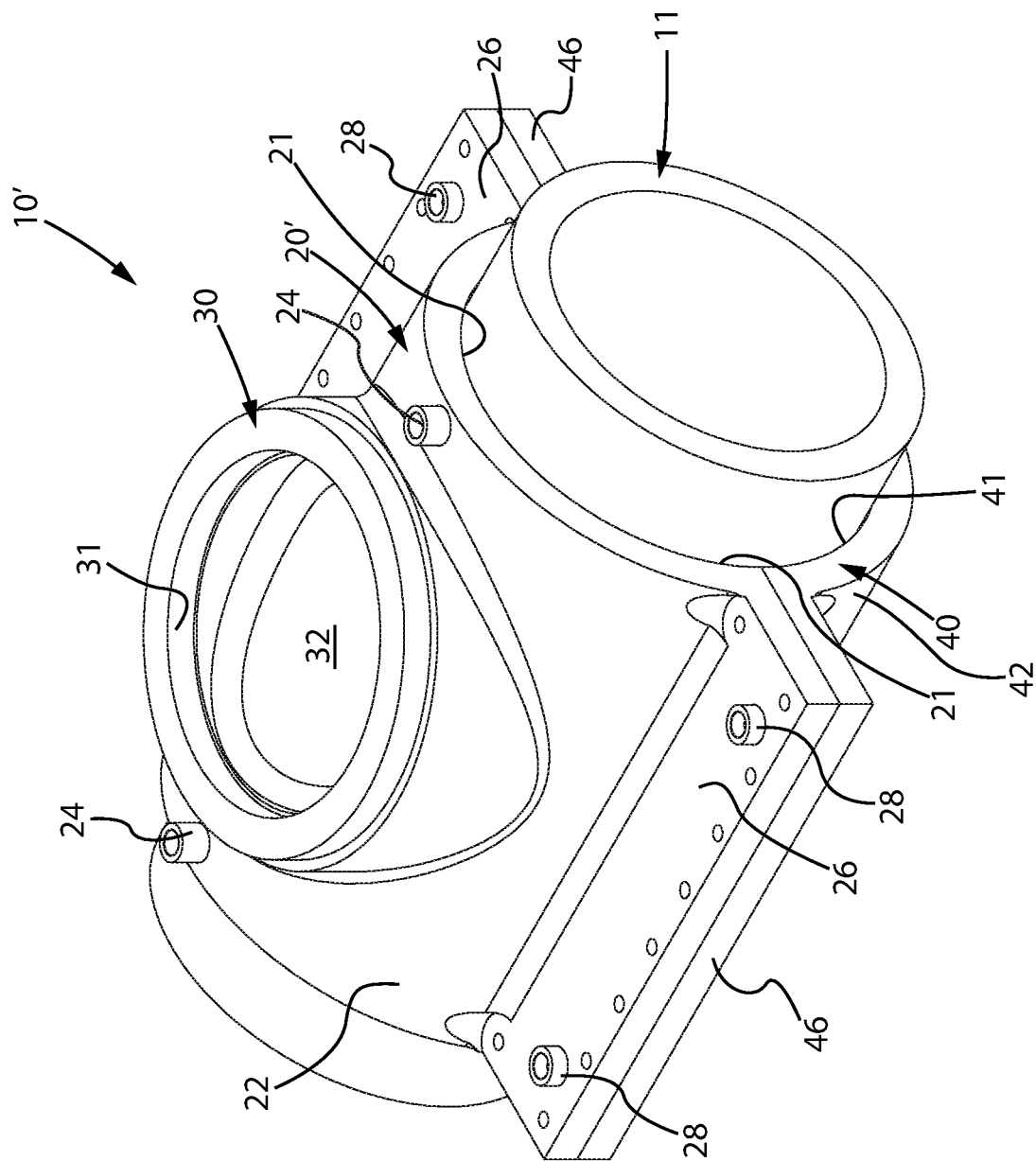
FIG. 4 is a perspective view of an electroweldable branch fitting for high diameter pipes according to a further embodiment of the present invention applied to a main pipe.
Figure 8:
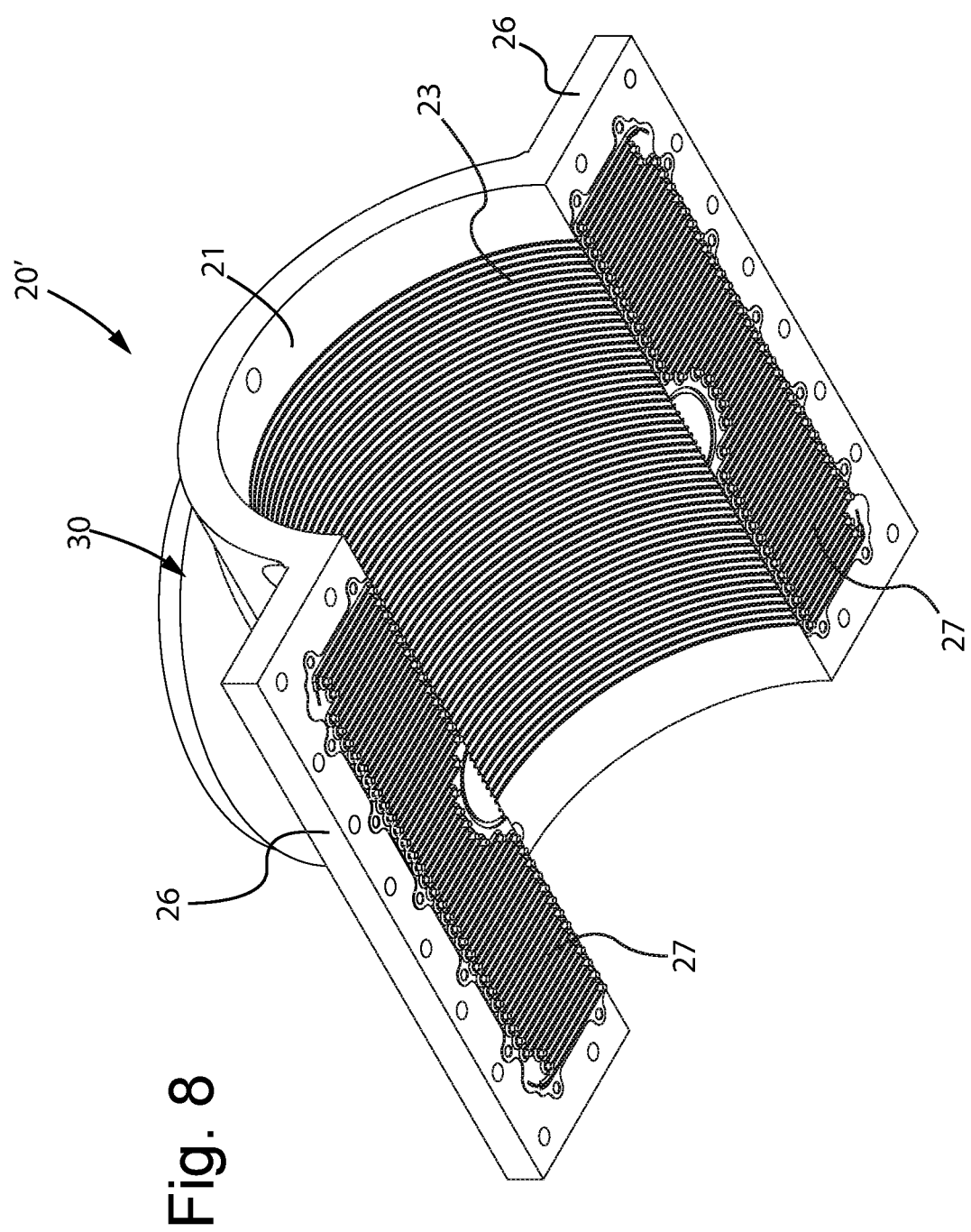
FIG. 8 is a perspective view of the first collar of the fitting of FIG. 4.

With reference to the figures, an electroweldable branch fitting for high diameter pipes is shown indicated overall with number 10 according to the first embodiment shown in FIGS. 1-3 and indicated overall with number 10' according to the further embodiment shown in FIGS. 4-7 applied to a branch pipe 11.

Branch fittings can be applied to pipes which will be called the "main pipe" below, for creating the connection with a branch pipe, bifurcated from the main pipe, with a diameter that is less than or equal to the main pipe, which in the examples is shown with an orthogonal axis with respect to the main pipe, but which can have any incidence therewith.

In the following description, parts common to both embodiments of the branch fitting 10, 10' are distinguished by the same numerical reference.

The electroweldable branch fitting 10, according to the first embodiment, comprises a collar 20 provided with a predetermined radius of curvature R equal to the radius of curvature of a main pipe to which the collar 20 must be applied.

The collar 20 identifies on opposite sides a concave surface 21 and a convex surface 22.

The fitting 10 further comprises at least one first electrical wire winding 23 associated with the concave surface 21 of the collar 20 and carrying one first pair of electrical terminals 24, arranged on the convex surface 22 of the collar for applying an electric current suitable for causing the electrofusion of the collar 20 on the main pipe, not shown in FIGS. 1-3.

The collar 20 has a continuous concave surface 21, i.e. not perforated, on which the first electrical wire winding 23 is uniformly distributed. The electrical wire winding 23 is arranged at least in the central part of the concave surface 21, preferably on as large a surface area as possible. In particular, it extends substantially to the entire concave surface 21, where "substantially to the entire concave surface" means that at the most only perimeter edge portions of the concave surface, having a negligible surface area with respect to such surface, are not occupied by the first electrical wire winding 23.

The collar 20 is a cylindrical covering sector of radius α, with a less than or equal to 180°, preferably equal to at least 150°. FIGS. 1-3 show a collar consisting in a cylindrical covering sector of radius α, with α equal to 170°, and having the first electrical wire winding 23 extending on a cylindrical surface of radius β, with β equal to 150°.

The collar 20 is provided centrally on the convex surface 22 of a branch sleeve 30, for the connection to a branch pipe, not shown, according to any known way.

The branch sleeve 30 identifies with the collar 20 a blind hole 31 having a bottom wall 32 consisting of the wall of the collar 20.

The bottom wall 32, i.e. the wall of the collar 20 internal to the branch sleeve 30, is perimetrally provided with a plurality of blind entrance pre-holes 33.

Furthermore, the collar 20 comprises, on the convex surface 22, a plurality of seats 25 for engaging fixing belts to the main pipe.

According to a preferred embodiment the collar 20 could have a diameter equal to 630 mm with branches of diameter comprised between 250 mm and 400 mm, i.e. branch diameter about half the diameter of the collar, and in particular about 40-60%.

The application of the branch fitting 10 according to the invention to a main pipe takes place by positioning the first collar 20 provided with the branch sleeve 30 at the main pipe. Preferably the fitting is kept locked in position on the main pipe by means of a pair of belts (not shown) positioned in the relevant seats 25 and wrapped around the main pipe.

An electric current is applied to the first pair of electrical terminals 24 by connecting the two plugs of the welder for welding the collar 20 to the main pipe by electrofusion.

After welding the branch fitting 10 to the main pipe, the bottom wall 32 of the branch sleeve 30 is removed, consisting of the wall of the collar 20 welded by electrofusion to the wall of the main pipe for creating a branch hole.

Preferably, the bottom wall 32 is perforated along the entrance pre-holes 33 before proceeding to completely remove the insert with the aid of a keyhole saw.

The branch fitting 10' according to a further embodiment of the invention, shown in FIGS. 4-8, comprises a first collar 20' consisting of a cylindrical covering sector of radius α, with α equal to 180°. In addition to what has been described for the first embodiment, the branch fitting 10' comprises a second collar 40 also shaped as a cylindrical covering sector of radius α, with α equal to 180°.

The second collar 40 is also provided with a further electrical wire winding 43, associated with a concave surface 41 thereof and carries a further first pair of electrical terminals 44, arranged on a convex surface 42 thereof for applying an electric current suitable for causing the electrofusion welding of the second collar 40 to the main pipe.

Also the concave surface 41 of the second collar 40 is continuous, i.e. not perforated.

Both collars 20', 40 are each provided with two opposite longitudinal flanges 26, 46, which form two pairs of flanges for mutual connection between the collars 20' and 40.

Each of the pair of flanges, consisting of a flange 26 of the first collar 20' coupled with the flange 46 of the second collar 40, carries a second electrical wire winding 27 and a second pair of electrical terminals 28 for applying an electric current suitable for causing the electrofusion welding of the relative pair of flanges 26, 46. In the example shown, the second electrical wire winding 27 with the relative pair of electrical terminals 28 are realized on the first collar 20' for both pairs of coupled flanges 26, 46. Alternatively, both could be arranged on the second collar 40, or on opposite collars.

In the second embodiment of the branch fitting 10' according to the invention, the branch sleeve 30 can reach a substantially equal diameter to the diameter of the collar 40, e.g. equal to 630 mm. This allows branches to be created with branch pipes having an inner diameter equal to the inner diameter of the main pipe, so-called T-branches.

The branch sleeves 30 shown in the figures only represent non-limiting embodiments and could have different lengths and conformations.

The application of the branch fitting 10' according to the invention to a main pipe takes place by positioning the first collar 20' provided with the branch sleeve 30 and the second collar 40 around the main pipe, coupling the opposite longitudinal flanges 26, 46 of both collars 20', 40.

An electric current is applied both to the first two pairs of electrical terminals 24, 44 for welding the collars 20', 40 by electrofusion to the main pipe and to the further pairs of electrical terminals 28, 48 for welding the pairs of flanges 26, 46 by electrofusion.

Preferably, the sequence of welding operations envisages in sequence the application of the electric current first to the terminals of the flanges, then to the terminals of the collars and then again to the terminals of the flanges.

The electroweldable branch fitting for high diameter pipes and the relative welding method according to the present invention have the advantage of realizing weldings to the branch pipe that completely eliminate the so called cold zones, i.e. surfaces on which welding does not take place by electrofusion, and therefore providing the largest welding surface possible. This is very important, especially in branches with the same diameter as the main pipe, in which the welding zone would otherwise be insufficient.

The increase in welded surface area by electrofusion implies an increase in the pressure sealing surface area which advantageously allows higher pressures to be tolerated inside the pipes.

Furthermore, the branch fitting according to the invention advantageously allows branches to be realized with larger diameter pipes.

Advantageously, T-branches can be performed, i.e. with branch pipes having the same diameter as the main pipe without reducing the maximum pressure allowed inside the pipes.

Advantageously, in performing the T-branches through the branch fitting according to the present invention, it is not necessary to interrupt the main pipe.

The electroweldable branch fitting for high diameter pipes and relative welding method as conceived herein is susceptible to many modifications and variations, all falling within the invention; furthermore, all the details are replaceable by technically equivalent elements. In practice, the materials used, as well as their dimensions, can be of any type according to the technical requirements.

The invention claimed is:

1. Electroweldable branch fitting for high diameter pipes comprising at least a first collar provided with a predetermined radius of curvature (R), wherein the collar identifies on opposite sides a concave surface and a convex surface, the branch fitting also comprising at least one first electrical wire winding associated with the concave surface of the collar and carrying one first pair of electrical terminals, arranged on the convex surface of the collar for applying an electric current adapted to cause the electrofusion of the collar, characterized in that wherein the concave surface of the collar is continuous, i.e. not perforated, and in that said first electrical wire winding is uniformly distributed on the concave surface at least in the central part thereof, said collar being provided with a branch sleeve, centrally on the convex surface, for the connection to a branch pipe, the branch sleeve identifying a blind hole having a bottom wall consisting of the wall of the collar, wherein the bottom wall is perimetrally provided with a plurality of blind entrance pre-holes.

2. Branch fitting according to claim 1, wherein said first electrical wire winding substantially occupies the entire concave surface.

3. Branch fitting according to claim 1, wherein said collar is a cylindrical covering sector of radius ($\alpha$) with ($\alpha$) being less than or equal to 180°.

4. Branch fitting according to claim 1, wherein said collar comprises a plurality of seats for fixing belts on the convex surface.

5. A method for welding a branch fitting according to claim 1, the method including at least the following steps:
 (a) positioning at least the first collar provided with a branch sleeve at a main pipe;
 (b) positioning a second collar at a main pipe, coupling opposite longitudinal flanges provided on both collars;
 (c) applying an electric current to the first pair of electrical terminals for welding by electrofusion the first collar to the main pipe;
 (d) creating a branch hole inside the branch sleeve by removing the assembly consisting of the wall of the first collar welded by electrofusion to the wall of the main pipe; and
 (e) applying an electric current to second pairs of electrical terminals each arranged on a pair of flanges and each connected to a relative second electrical wire winding arranged on one of the coupled flanges.

6. Electroweldable branch fitting for high diameter pipes comprising at least a first collar provided with a predetermined radius of curvature (R), wherein the collar identifies on opposite sides a concave surface and a convex surface, the branch fitting also comprising at least one first electrical wire winding associated with the concave surface of the collar and carrying one first pair of electrical terminals, arranged on the convex surface of the collar for applying an electric current adapted to cause the electrofusion of the collar, wherein the concave surface of the collar is continuous, and in that said first electrical wire winding is uniformly distributed on the concave surface at least in the central part thereof, said collar being provided with a branch sleeve, centrally on the convex surface, for the connection to a branch pipe, the branch sleeve identifying a blind hole having a bottom wall consisting of the wall of the collar, wherein said first collar embraces a cylindrical covering sector of radius ($\alpha$) with ($\alpha$) equal to 180°, and in that it comprises a second collar also shaped as cylindrical covering sector of radius ($\alpha$), with ($\alpha$) equal to 180°, and also provided with a further first electrical wire winding, associated with a concave surface of the second collar and carrying a further first pair of electrical terminals, arranged on a convex surface of the second collar for applying an electric current adapted to cause the electrofusion of the second collar, the concave surface of the second collar also being continuous.

7. Branch fitting according to claim 6, wherein both collars are provided with two opposite longitudinal flanges, which form two pairs of flanges for mutual connection, each of said pair of flanges carrying a second electrical wire winding and a second pair of electrical terminals for applying an electric current suitable for causing the electrofusion welding of the relative pair of flanges.

8. Branch fitting according to claim 6, wherein said branch sleeve has a diameter substantially equal to the diameter of the collar.

* * * * *